United States Patent [19]
Whitesell

[11] Patent Number: 5,743,298
[45] Date of Patent: Apr. 28, 1998

[54] SPRING PULSATION DAMPENER

[75] Inventor: Richard F. Whitesell, Clarence, N.Y.

[73] Assignee: Techniflo Corporation, Clarence Center, N.Y.

[21] Appl. No.: 635,600

[22] Filed: Apr. 22, 1996

[51] Int. Cl.$^6$ ............................................. F16L 55/04
[52] U.S. Cl. ................................. 138/31; 417/53
[58] Field of Search ................. 138/30, 31; 220/720, 220/721; 417/53

[56] References Cited

U.S. PATENT DOCUMENTS

| | | | |
|---|---|---|---|
| 912,502 | 2/1909 | Squires | 138/31 |
| 1,859,400 | 5/1932 | Kersey . | |
| 2,342,355 | 2/1944 | Mercier | 220/721 |
| 2,809,666 | 10/1957 | Judd | 138/31 |
| 2,875,789 | 3/1959 | Wright | 138/31 |
| 3,015,345 | 1/1962 | Michael | 138/31 |
| 3,115,897 | 12/1963 | Sparling . | |
| 3,893,486 | 7/1975 | Meyers | 138/31 |
| 4,117,023 | 9/1978 | Kamiya et al. . | |
| 5,081,847 | 1/1992 | Anderson, Jr. . | |
| 5,210,382 | 5/1993 | Paley et al. | 138/31 |

FOREIGN PATENT DOCUMENTS

| | | | |
|---|---|---|---|
| 3925294 | 2/1991 | Germany | 138/31 |
| 1229506 | 5/1986 | U.S.S.R. | 138/31 |
| 1622706 | 1/1991 | U.S.S.R. | 138/31 |

OTHER PUBLICATIONS

Techniflo Corporation, Pulsation Controllers, 1975.
Techniflo Corporation, Pulsation Control, 1978.

*Primary Examiner*—Stephen F. Gerrity
*Attorney, Agent, or Firm*—Howard M. Ellis; Marianne Fuierer

[57] ABSTRACT

A gas or liquid pulsation dampening system is provided which minimizes the size of the vessel required to effectively dampen gas or liquid pulsations while maximizing the dampening effect. The gas or liquid pulsation dampening system comprises a novel spring pulsation dampening valve and a vessel for housing the valve and for containing a gas or liquid. The vessel is equipped with a pulsating gas or liquid inlet and a dampened gas or liquid outlet, and a support for holding the spring pulsation dampening valve in axial alignment with the dampened gas or liquid outlet. The spring pulsation dampening valve comprises first and second ends, a stationary outer sleeve, and a spring loaded gas or liquid flow restricting tube positioned in the interior of the stationary sleeve for axial movement therein. The gas or liquid flow restricting tube includes a gas or liquid intake at the first end of the pulsation dampening valve and a gas or liquid outlet at the second end of the pulsation dampening valve, and a spring operated pressure receiver at the gas or liquid intake for receiving and sensing gas or liquid pressure.

24 Claims, 4 Drawing Sheets

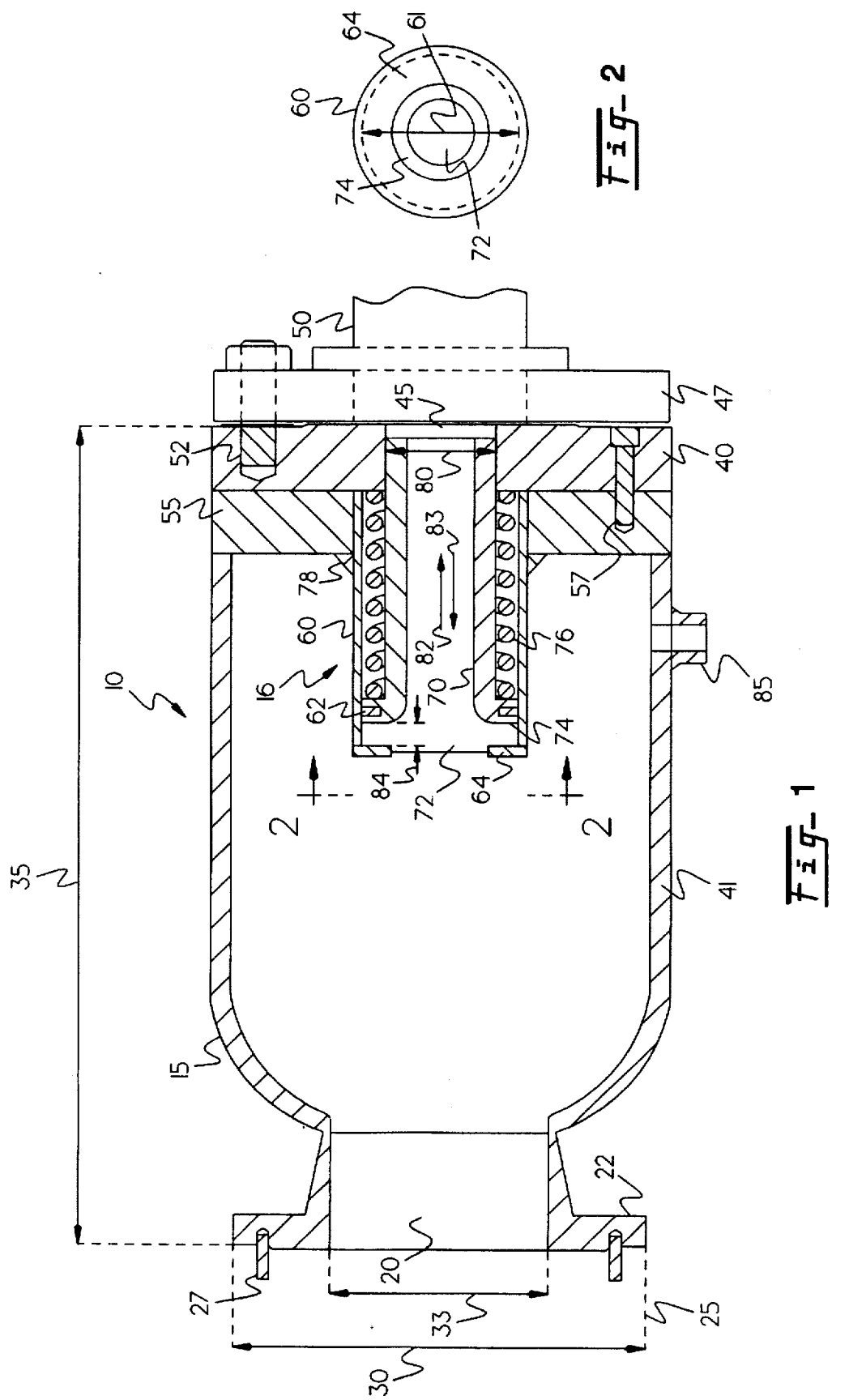

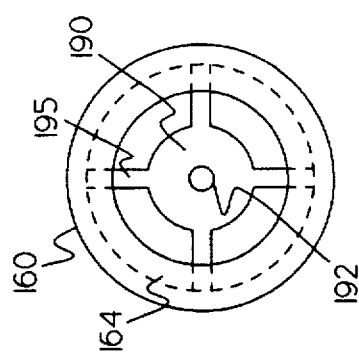
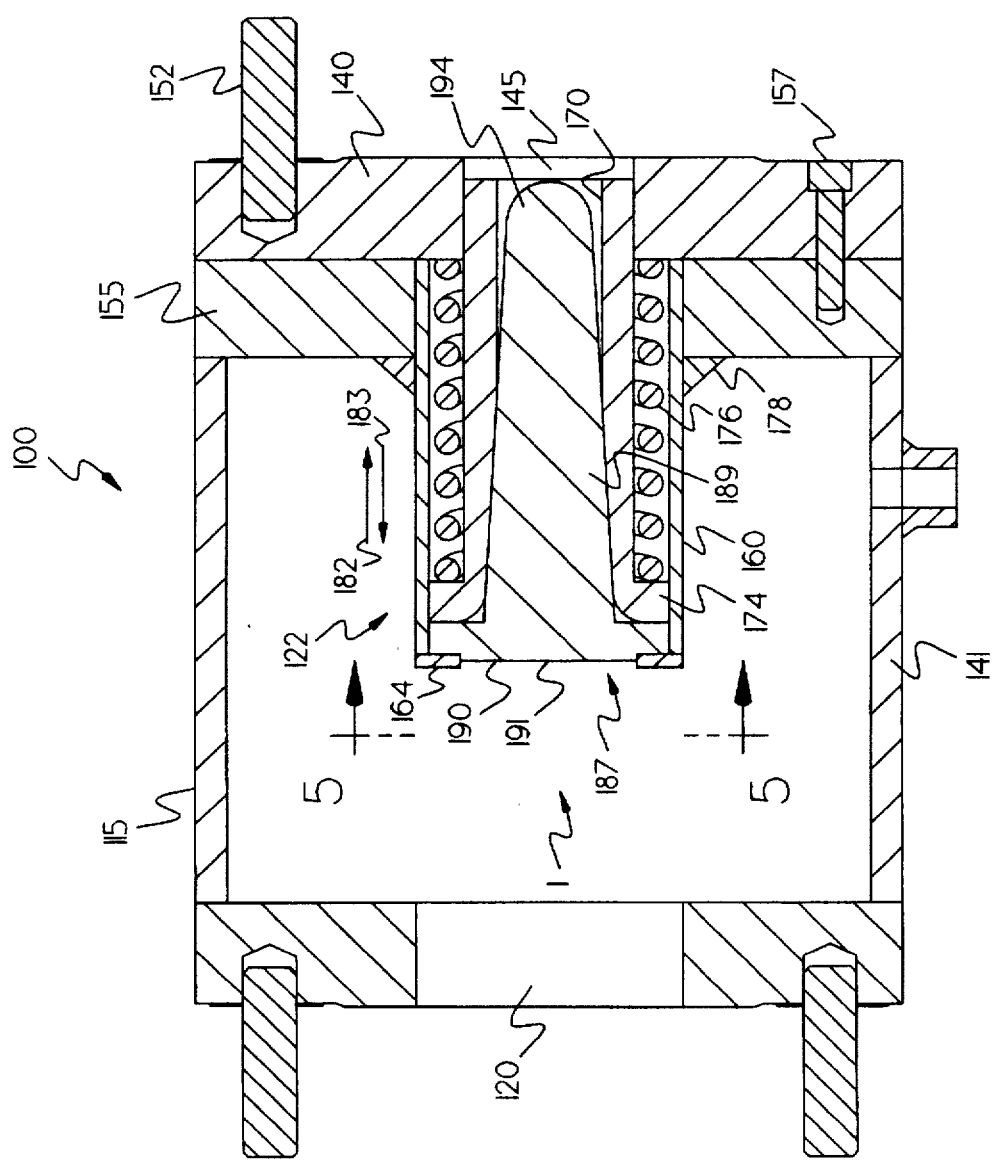

SPRING PULSATION DAMPENER

TECHNICAL FIELD

The present invention relates generally to pulsation dampeners, and more particularly, to flow-through devices for dampening harmful gas or air pulsations associated with reciprocating compressor piping systems.

BACKGROUND OF THE INVENTION

It is often desirable to compress a quantity of compressible fluid such as air or other gasses. Fluid thus compressed possesses great potential energy because when the external pressure is removed the fluid expands rapidly. The controlled expansive force of compressed fluid is used in many ways and provides the motive force for air motors and tools, including pneumatic hammers, air drills, sandblasting machines and paint sprayers, to name but a few.

It is also desirable to pump non-compressible media such as water, liquified gases, hydraulic fluids, chemical slurries and other liquids. This is often accomplished by means of a reciprocating pump.

Mechanical means, such as compressors, pumps, blowers and the like, are used to compress fluids. One problem associated with compression devices like reciprocating compressors are the pressure pulsations emitted on their intakes and outlets as a result of the cyclical action of their pistons. Reciprocating compressors generally produce fundamental pulsations in the range of about 5 Hz to about 30 Hz depending on the compressor speed, number of cylinders pumping into the same conduit, the phase relationship, or firing order of the cylinders and whether the cylinder is single acting or double acting. The peak to peak amplitude of the pulsations can be in the range of about 10% to 50% of line pressure.

These pulsations can cause numerous problems as they are transmitted through the pipe lines which transport the air or gas to its destination. In addition to causing noise and pipe vibration, pulsations increase stresses on tubes and baffles, cause meters to read erroneously, and result in increased failures of other operating components, such as heat exchanger tubes. Further, pulsations can decrease both the pumping efficiency and valve life of the cylinders of the compressor or pumping device.

Pulsation dampeners are designed to prevent or decrease the pressure changes occurring at the intake or outlet of a compressor from being transmitted to pipe lines. These devices smooth the flow and stop vibration thereby alleviating the problems associated with pulsations. The result is a reduction in maintenance of pipe lines, compressors, pumps and associated equipment.

Known pulsation dampeners comprise pressure vessels closely coupled to the source of pulsating gas or liquid. The capacity of these vessels must be sufficient to reduce the rate of change of gas or liquid pressure at the source of the gas or liquid pressure so that the pressure does not change rapidly enough to cause the gas or liquid to oscillate. The volume of the vessel, in effect, absorbs the pulsations thus preventing them from being transmitted to the outlet of the vessel.

One problem associated with known pulsation dampeners is the relatively large size of the vessel required to achieve effective dampening action. In some cases, exceedingly large vessels must be used to achieve the desired dampening results. These large vessels can be very costly, especially when designed for high pressure applications.

Accordingly, there is a need for improved more economic pulsation dampening systems which permit downsizing of the pressure vessel while maximizing dampening action.

SUMMARY OF THE INVENTION

It is therefore a principal object of the invention to provide a pulsation dampening system comprising a spring pulsation dampening valve and a vessel for housing the valve and for containing a gas or liquid. The tank-like vessel is equipped with a pulsating gas or liquid inlet and a dampened gas or liquid outlet, and support means for holding the spring pulsation dampening valve in axial alignment with the dampened gas or liquid outlet. The spring pulsation dampening valve comprises first and second ends, a stationary outer sleeve, and a gas or liquid flow restricting tube means which is spring loaded to maintain the tube resiliently directed towards the first or gas or liquid intake end of the valve. The gas or liquid flow restricting tube means, which is positioned in the interior of the stationary sleeve for axial movement therein, has a gas or liquid intake at the first end of the pulsation dampening valve and gas or liquid outlet at the second end of the pulsation dampening valve, and a spring operated pressure receiving means proximate to the gas or liquid intake for receiving and sensing gas or liquid pressure. The spring holds the pressure receiving means resiliently against increases in gas or liquid pressure. As pressure fluctuates the pressure receiving means, including the gas or liquid flow restricting tube oscillate axially in the stationary tube to increase and decrease the capacity of the vessel in opposition to pressure fluctuations.

Thus, the pulsation dampening system of the invention generally comprises as principal elements a spring operated pulsation dampening valve and a vessel for containing gas or liquid. The vessel, which may be a pressure vessel, is defined by one or more walls with an inlet for receiving pulsating gas or liquid and an outlet for discharging dampened gas or liquid. The spring pulsation dampening valve minimizes the size of the vessel required to effectively dampen pulsations while maximizing the dampening effect.

As previously stated, the spring pulsation dampening valve comprises a stationary sleeve positioned within the vessel in axial alignment with the opening for discharging dampened gas or liquid, and is maintained in the vessel by support means affixed to a wall of the vessel. Support means may comprise a back plate, for example, having an orifice axially aligned with the dampened gas or liquid outlet for discharging dampened gas or liquid. The spring pulsation dampening valve further includes flow restriction tube means, which can be a pipe or a choke tube, slidably disposed within and extending axially through the stationary sleeve. The gas or liquid flow restriction tube means includes a gas or liquid intake end having an intake orifice, and a gas or liquid outlet end. A spring operated pressure receiving means proximate to the gas or liquid intake end can be affixed to and preferably made integral with the gas or liquid flow restriction tube means. The pressure receiving means is comprised of a conduit having a flanged or generally bell shaped gas or liquid intake. The gas or liquid flow restriction tube means and the pressure receiving means as a unitized structure are spring operated for axial oscillation within the stationary sleeve.

The spring of the spring pulsation dampening valve may be a helical type spring disposed within the stationary sleeve, positioned between the pressure receiving means and the support means. The spring means tends to hold the pressure receiving means resiliently against increases in gas or liquid pressure by maintaining it in close proximity to the gas or liquid intake end of the flow restriction tube means.

It is yet a further object of the invention to provide for a pulsation dampening system having a spring pulsation dampening valve which includes gas or liquid flow modulating means engageable with the pulsation dampening valve. The gas or liquid flow modulating means comprises a terminal end portion affixed to the stationary sleeve of the spring pulsation dampening valve, and a tapered body portion extending from the terminal end portion at least partially through the intake orifice of the pulsation dampening valve. The diameter of the tapered body portion decreases at increasing distances from the terminal end portion.

It is still a further object of the invention to provide an improved pulsation dampening system comprising a vessel for containing compressed gas or liquid and a spring pulsation dampening valve wherein the vessel is divided into a plurality of chambers by at least one partition wall having an opening therethrough. One of the chambers is a gas or liquid intake chamber adapted to be connected to a compressor or pump. The other chamber is a gas or liquid discharge chamber adapted to be connected to a gas or liquid transmission line.

More specifically, this aspect of the invention comprises a spring pulsation dampening valve and a vessel for housing the valve and for containing a compressed gas or liquid. The vessel is subdivided into a plurality of interior chambers by at least one partition wall to provide at least one gas or liquid intake chamber with a pulsating gas or liquid inlet and at least one gas or liquid discharge chamber with a dampened gas or liquid outlet. The partition wall provides support means for holding the spring pulsation dampening valve in the gas or liquid intake chamber in axial alignment with the dampened gas or liquid outlet. The spring pulsation dampening valve comprises first and second ends, a stationary outer sleeve, a gas or liquid flow restricting tube means positioned in the interior of the stationary sleeve for axial movement therein. The gas or liquid flow restricting tube means includes a gas or liquid intake proximate to the first end of the pulsation dampening valve and gas or liquid outlet at the second end of the pulsation dampening valve, and a spring operated pressure receiving means at the gas or liquid intake for receiving and sensing gas or liquid pressure.

The stationary sleeve of the spring pulsation dampening valve disposed within the intake chamber of the vessel may be affixed to the partition wall in axial alignment with an opening in the partition wall. The gas or liquid flow restricting tube means is slidably disposed within the stationary sleeve and extends through the opening in the partition wall. The spring operated pressure receiving means are disposed within the stationary sleeve, and surround the gas or liquid intake such that the pressure receiving means moves with the gas or liquid flow restricting tube means in response to gas or liquid pressure changes. The spring can be positioned between the pressure receiving means and the partition wall. The partition wall may be, for instance, an acoustic baffle for dampening sound vibrations within the vessel.

It is still a further object of the invention to provide a method of dampening pulsations in gas or liquid at the intake or outlet of a compressor or pump. The method comprises the steps of:

(i) introducing pulsating gas or liquid into a vessel;

(ii) sensing the amplitude of the gas or liquid pulsations with a spring pulsation dampener comprising a spring operated gas or liquid pulsation dampening valve mounted in said vessel, and (iii) varying the volume of the vessel in relationship to the sensed amplitude of the gas or liquid pulsations by compressing and relaxing the spring of the spring operated gas or liquid pulsation dampening valve in response to the pulsations.

BRIEF DESCRIPTION OF THE DRAWINGS

For a further understanding of the invention, as well as its characterizing features, reference should now be made to the accompanying drawings wherein:

FIG. 1 is a side sectional view of a preferred embodiment of the spring pulsation dampener.

FIG. 2 is an end view of a pulsation dampening valve of the spring pulsation dampener taken along lines 2—2 of FIG. 1.

FIG. 3 is a side sectional view of an alternative embodiment of a spring pulsation dampener having a pulsation dampening valve with gas or liquid flow modulating means.

FIG. 5 is an end view of the pulsation dampening valve taken along line 5—5 of FIG. 3.

DESCRIPTION OF THE PREFERRED EMBODIMENTS

Figure 4:
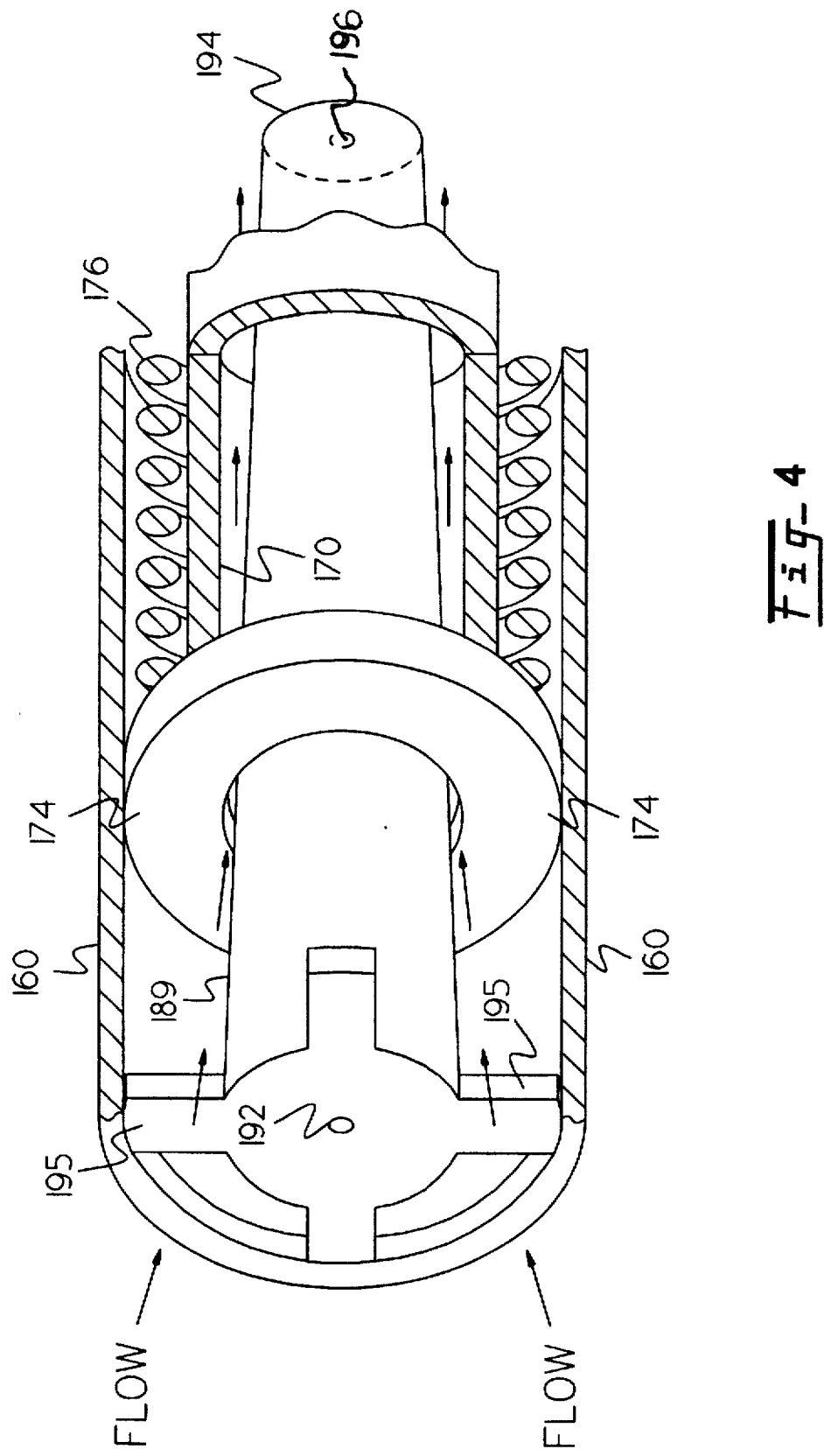
FIG. 4 is a perspective view of the pulsation dampening valve of the spring pulsation dampener of FIG. 3.

As shown in FIG. 1 an embodiment of a pulsation dampener 10 of the present invention includes a vessel 15 and a pulsation dampening valve 16 housed in vessel 15. Vessel 15 is usually a pressure vessel, having a plurality of peripheral walls 40 and 41. Vessel 15 includes an opening 20 through which pulsating gas or liquid enters. Opening 20 is preferably adapted to be closely coupled to a compressor, pump, blower or other source of pulsating compressed gas or liquid (not shown). Opening 20 may be connected to a gas or liquid transmission line or may otherwise be in fluid communication with either the intake or outlet port of a compressor, pump, blower, or other source of pulsating gas or liquid (not shown).

In the preferred embodiment, opening 20 is surrounded by flanges 22 for connecting with gas or liquid conveying line 25 by means of studs 27. The outer diameter 30 of opening 20 is preferably sized to match the outer diameter of gas or liquid conveying line 25. Likewise, inner diameter 33 is sized to match the inner diameter of gas or liquid conveying line 25. The connection of gas or liquid conveying line 25 to opening 20 will preferably conform to American National Standards Institute (ANSI) standard B16.5 which contains detailed specifications for such pipe fittings and is readily available and well known to those in the art.

To achieve optimal dampening effect, vessel 15 is preferably of a length 35 which relates to outer diameter 30 and inner diameter 33 of opening 20. Table 1 shows the preferred relationship between the nominal pipe size of gas or liquid conveying pipe 25, outer diameter 30, inner diameter 33 and length 35.

TABLE 1

| Pipe Size (25) | Outer Diameter (30) | Inner Diameter (33) | Length (35) |
| --- | --- | --- | --- |
| 3" | 8 ⅝" | 3" | 10" |
| 4" | 10 ¾" | 4" | 12" |
| 5" | 12 ¾" | 5" | 14" |
| 6" | 12 ¾" | 6" | 14" |
| 8" | 16" | 8" | 16" |
| 10" | 18" | 10" | 18" |
| 12" | 20" | 12" | 20" |
| 14" | 24" | 14" | 24" |

Numerical values of the Table can change for special cases

Peripheral wall 40 has an opening 45 through which dampened, or smoothed gas is transported. For purposes of this specification the term 'dampen' means to decrease in amplitude or force.

Peripheral wall 40 may be adapted to be connected to a pipe 50 for conveying the dampened gas or liquid to pneumatic devices (not shown) located downstream. Peripheral wall 40 should be of a thickness suitable for securely attaching standard pipe fittings for pipe 50. The flange 47 of pipe 50 may be attached to peripheral wall 40 using studs 52 (one shown), nuts and bolts or other conventional connecting means. The connection of pipe 50 to peripheral wall 40 will preferably be in accordance with but not restricted to ANSI standard B16.5.

Pulsation dampening valve 16 of the system includes a stationary outer sleeve 60 which in the preferred embodiment is a rigid, hollow, cylindrical conduit or jacket located within vessel 15 and axially aligned with opening 45 in peripheral wall 40. Support means 55 supports stationary sleeve 60 holding it rigidly in contact with peripheral wall 40 and in axial alignment with opening 45. Support means 55 may be a circular metal back plate having a central opening for receiving stationary sleeve 60. Support means 55 may be adapted for affixing to peripheral wall 40 by means of cap screws 57 or other equivalent means. Support means 55 may include welds 78 to provide further support and stability for stationary sleeve 60. Other conventional means, such as sleeve support brackets may be employed to hold stationary sleeve 60 in axial alignment with opening 45 in peripheral wall 40, or to affix stationary sleeve 60 to support means 55. Such alternatives remain within the scope of the present invention.

Slidably disposed within stationary sleeve 60 is gas or liquid flow restricting tube 70, which may be a pipe or choke tube, to restrict the flow of gas or liquid between vessel 15 and pipe 50. Gas or liquid flow restricting tube 70 has an outer diameter 80 which is preferably equal to, or slightly smaller than the diameter of opening 45 so as to allow gas or liquid flow restricting tube 70 to move axially in directions 82 and 83 through opening 45. Gas or liquid flow restricting tube 70 further includes a gas or liquid intake end having an intake orifice 72 and a gas or liquid outlet end opposite the gas or liquid intake end.

Gas or liquid flow restricting tube 70 includes spring operated pressure receiving means 74 as an extension of restricting tube 70. Spring operated pressure receiving means 74 provides an increased surface area for sensing and receiving gas or liquid pressure. Pressure receiving means 74 may be formed as an integral part of gas or liquid flow restricting tube 70 by flaring the outer edges of gas or liquid flow restricting tube 70, imparting a generally bell shape to intake orifice 72.

The gas or liquid outlet end of gas or liquid flow restricting tube 70 may extend partially through opening 45 into pipe 50 in the absence of gas or liquid pressure fluctuations within in vessel 15. Alternatively, the gas or liquid outlet end of gas or liquid flow restricting tube 70 may rest within vessel 15 in the absence of gas or liquid pressure fluctuations, then move axially in direction 82 through opening 45, into pipe 50 as gas or liquid pressure increases.

FIG. 2 is an end view taken along lines 2—2 of FIG. 1. FIG. 2 shows spring loaded pressure receiving means 74 in relation to stationary sleeve 60. Other pressure receiving means may be employed, including collars or flanges surrounding, or positioned near intake orifice 72. These remain within the scope of the present invention.

Stationary sleeve 60 has inner diameter 61 (FIG. 2) large enough to fit closely around pressure receiving means 74. In the preferred embodiment stationary sleeve 60 has an i.d. 61 of about 10 inches. A Teflon® 'O' ring 62 (FIG. 1) may be affixed to pressure receiving means 74 to reduce friction and provide for smooth axial oscillation of gas or liquid flow restricting tube 70 and pressure receiving means 74 in direction 82 and 83 within stationary sleeve 60. Alternative means of providing optimal movement of pressure receiving means 74 within stationary sleeve 60 may be employed in the present invention, which alternative means would become apparent to those skilled in the art from reading this disclosure.

Retainer 64, such as a Tru-arc™ retaining ring, or other retaining means may be affixed at one end of stationary sleeve 60 to prevent movement of pressure receiving means 74 and gas or liquid flow restricting tube means 70 in direction 83 past the end of stationary sleeve 60.

Spring 76, which may be a helical type spring, is held in contact with pressure receiving means 74 such that spring 76 tends to hold pressure receiving means 74 resiliently against increases in gas or liquid pressure received by the pressure receiving means. Spring 76 may be disposed within stationary sleeve 60 extending axially along gas or liquid flow restricting tube 70 between pressure receiving means 74 and peripheral wall 40. Drain means 85 may be provided at the bottom of vessel 15 to discharge moisture or other liquid.

In the preferred embodiment, gas or liquid flow restriction tube means 70 of the spring pulsation dampening valve is sized to provide a pressure drop across it of about one percent of line pressure. For example, for a compressor operating at a nominal 150 psi, gas or liquid flow restriction tube means would be sized for a 1.5 psi pressure drop.

The pressure drop across gas or liquid flow restriction tube 70 biases spring 76 in direction 82 by a distance 84 (FIG. 1) determined by the magnitude of the pressure drop in the absence of pulsations, and the physical properties of spring 76. As the amplitude of gas or liquid pulsations at opening 20 increases, the impact of gas or liquid upon pressure receiving means 74 forces gas or liquid flow restricting tube 70 to further retract within stationary sleeve 60 in direction 82 against the action of spring 76. As gas or liquid flow restricting tube 70 and pressure receiving means 74 retract, the volume of vessel 15 increases. The increase in vessel 15 capacity acts to limit the increase in gas or liquid pressure.

Likewise, as the amplitude of the gas or liquid pulsations at opening 20 decreases, pressure on pressure receiving means 74 decreases allowing spring 76 to move gas or liquid flow restricting tube 70 in direction 83. As gas or liquid flow restricting tube 70 moves in direction 83 the volume of vessel 15 decreases, limiting the decrease in gas or liquid pressure within vessel 15.

As a result of the axial oscillation of gas or liquid flow restricting tube 70 and pressure receiving means 74 within stationary sleeve 60, changes in gas or liquid pressure within vessel 15 tend to be opposed. Therefore, fluctuations in the pressure of gas or liquid flowing through gas or liquid flow restricting tube 70 will be of reduced amplitude relative to fluctuations occurring at opening 20.

FIG. 3 depicts a further embodiment of the spring pulsation dampener 100. As in the previous embodiment, spring pulsation dampener 100 comprises as principal components a vessel 115 and a spring pulsation dampening valve 122 housed in vessel 115. Vessel 115 is equipped with a plurality of peripheral walls 140 and 141. Pulsating gas or liquid enters vessel 115 through opening 120. Peripheral wall 140 has an opening 145 adapted to be connected to a gas or liquid transmission line (not shown) by means of a plurality of studs 152 (one shown) through which dampened gas or liquid is transported.

Spring pulsation dampening valve 122 comprises an outer stationary sleeve 160 affixed to support means 155 by welds 178. Support means 155 is affixed to peripheral wall 140 by means of cap screws 157 (one shown). A further component of spring pulsation dampening valve 122 comprises an axially oscillating gas or liquid flow restricting tube 170 disposed within stationary sleeve 160. The inside diameter of gas or liquid flow restricting tube 170 is preferably uniform. A flanged pressure receiving means 174 of gas or liquid flow restricting tube 170 reacts to increases in gas or liquid pressure by moving against the action of helical spring 176 in direction 182, as disclosed in the previous embodiment.

Spring pulsation dampening valve 122 also comprises a gas or liquid flow modulator 187 adapted to slidably engage and extend at least partially into the interior of gas or liquid flow restricting tube 170, as best shown by FIGS. 3–4. Gas or liquid flow modulator 187, which remains stationary relative to outer sleeve 160, is held in place at the first terminal end portion 191 by flanged retainer 164. The gas or liquid flow modulator is comprised of a generally conically shaped tapered body 189 extending from diametrically enlarged first terminal end portion 191, and gradually diminishes diametrically towards second terminal end portion 194.

Tapered body 189 of gas or liquid flow modulator 187 may be hollow and have openings 192 and 196 (FIG. 4) which serve as gas or liquid entry and exiting ports, respectively. Hence, the gas or liquid flow modulator also performs as a conduit for conveying gas or liquid. Alternatively, tapered body 189 may be a solid, non-hollow structure.

First terminal end portion 191 of gas or liquid flow modulator 187 is equipped with a central hub 190 (FIG. 5) and spokes 195 extending radially from the central hub for engaging tapered body 189 with stationary sleeve 160 as best shown by FIGS. 4 and 5. Spokes 195 are affixed to the stationary sleeve by welding or other equivalent means.

Figure 6:
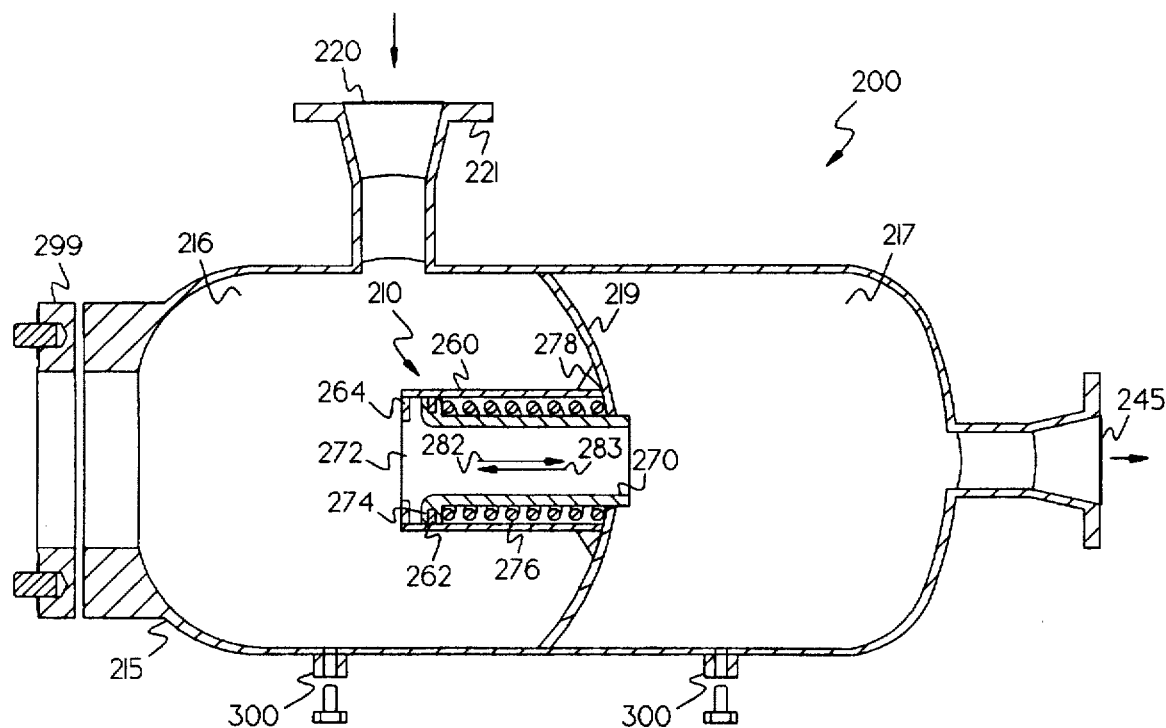
FIG. 6 is a side sectional view of a further embodiment of the spring pulsation dampener with dual chambers.

FIG. 6 illustrates a further embodiment of the spring pulsation dampener 200 according to the present invention. Spring pulsation dampener 200 comprises as principal components vessel 215 and spring pulsation dampening valve 210 housed in vessel 215. The vessel is divided into two chambers 216 and 217 by dividing wall 219, which may be, for example, an acoustic baffle for improving the sound properties of the spring pulsation dampener.

The vessel comprises a gas or liquid inlet port 220 and gas or liquid outlet port 245. Both ports are preferably equipped with joint fittings. Gas or liquid inlet port 220 is adapted for connecting to a conduit (not shown) for transmission of pulsating gases or liquids to intake chamber 216 from a compressor, pump, blower or other source of pulsating gas or liquid. Inlet port 220 may also be adapted for direct engagement to a compressor, blower or other source of pulsating gas or liquid. In either instance, inlet port 220 can be joined to gas or liquid conduits or other transmission lines by means of flange 221, according to industry standard ANSI B16.5.

Gas or liquid outlet port 245 may also be equipped with appropriate joint fittings for connecting to a gas or liquid transmission line for carrying smoothed, dampened gas or liquid to its destination. Typically, this may include pneumatic devices or other apparatus or gas or liquid transporting mechanisms requiring gas or liquid of constant pressure.

An access port 299 may be provided for maintenance or other access to the interior of vessel 215. Drains 300 allow condensation and other liquids to be discharged from chambers 216 and 217.

The pulsation dampening valve 210 (FIG. 6) comprises an outer stationary sleeve 260 affixed to dividing wall 219 by means of welds 278, or other equivalent mounting means. Gas or liquid flow restricting tube 270 is slidably disposed within the interior of stationary sleeve 260. Divider 219 includes an opening for axial translation of the gas or liquid flow restricting tube 270 in directions 283 and 282.

Gas or liquid flow restricting tube 270 includes a flanged spring operated pressure receiving means 274 at intake orifice 272. As in previous embodiments of the invention, spring operated pressure receiving means 274 of the gas or liquid flow restricting tube provides a pressure receiving surface to sense changes in gas or liquid pressure within gas or liquid intake chamber 216. A Teflon® 'O' ring 262, or other suitable friction accommodating means, may be affixed to pressure receiving means 274 at the point of closest proximity to stationary sleeve 260.

A helical spring 276 is disposed between the outer stationary sleeve 260 and gas or liquid flow restricting tube 270 and pressure receiving means 274 at a first end and divider 219 at a second end. Spring 276 tends to hold pressure receiving means 274 resiliently against increases in gas or liquid pressure in gas or liquid intake chamber 216. Retainer 264, which may be a Tru-arc retaining ring, is affixed to stationary sleeve 260 as a stop to restrict axial motion of gas or liquid flow restricting tube 270 and pressure receiving means 274 in direction 283 past the terminal end of stationary sleeve 260.

As the amplitude of gas or liquid pulsations entering gas or liquid intake chamber 216 through opening 220 increases, the impact of the gas or liquid upon spring operated pressure receiving means 274 forces it and the gas or liquid flow restricting tube 270 to retract, i.e., move axially in direction 282, against the action of spring 276 and oscillate from that location. As pressure receiving means 274 retracts the volume or capacity of gas or liquid intake chamber 216 increases. This increased capacity tends to reduce the pressure in the gas or liquid intake chamber. Likewise, as the amplitude of gas or liquid pulsations entering gas or liquid intake chamber 216 decreases, pressure on pressure receiving means 274 decreases and is overcome by the force of spring 276. Spring 276 forces the gas or liquid flow restricting tube 270 to move in direction 283 and oscillate under the force of the pulsating gas or liquid, thus decreasing the capacity of gas or liquid intake chamber 216 and tending to increase gas or liquid pressure in gas or liquid intake chamber 216.

Together, gas or liquid flow restricting tube 270, pressure receiving means 274 and helical spring 276 act to oppose changes in gas or liquid pressure within gas or liquid intake chamber 216. As a result, gas or liquid flowing from gas or liquid intake chamber 216 to gas or liquid discharge chamber 217 through gas or liquid flow restricting tube 270 will be of relatively constant pressure. In addition, the capacity of chamber 217 further acts to dampen pressure fluctuations of gas or liquid as it is discharged through outlet port 245.

While the spring pulsation dampener shown in FIG. 6 is a two chambered device, embodiments having three or more chambers with one or more gas or liquid flow restricting tubes, stationary sleeves, spring means, and pressure receiving means to provide even greater dampening effects are contemplated and are within the scope of the invention.

Figure 6A:
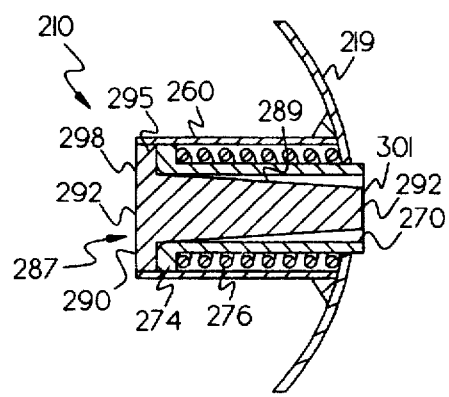
FIG. 6a side sectional view of the pulsation dampening valve with gas or liquid flow modulating means removed from the vessel of FIG. 6.

FIG. 6a shows the pulsation dampening valve 210 of FIG. 6 removed from vessel 215 with the addition of gas or liquid flow modulator 287 adapted to fit at least partially within gas or liquid flow restricting tube 270. Gas or liquid flow modulator 287 is comprised of tapered body 289 and terminal end portion 290. Tapered body 289 is generally conically shaped with the widest diameter of tapered body 289 being closest to first end 298 and the smallest diameter of tapered body 289 being at second end 301.

Tapered body 289 may be a hollow conduit with openings 292 extending axially through body 289. Openings 292 allow the transmission of gas or liquid through tapered body 289. Alternatively, tapered body 289 may be a solid, non-hollow body.

Terminal end portion 290 of gas or liquid flow modulator 287 comprises connecting means 295 for engaging tapered body 289 with stationary sleeve 260. Preferably, connecting means 295 is comprised of a central hub with spokes similar in design to that shown by FIGS. 4–5 extending from terminal end portion 290 of gas or liquid flow modulator 287 to stationary sleeve 260. Connecting means 295 can be affixed to stationary sleeve 260 by welding or other equivalent means. It should be understood, connecting means 295 may be of any design which allows gas or liquid pressure to be received on spring operated pressure receiving means 274 of gas or liquid flow restricting tube 270.

The invention further provides for methods of dampening pulsations at the inlet or outlet of a compressor or pump, for example. Pulsating gas or liquid is introduced into a vessel, such as that of FIG. 6. Means for sensing the amplitude of the gas or liquid pulsations, such as pressure receiving means 274 are provided within the vessel for sensing fluctuations in pressure within the vessel. The amplitude of the gas or liquid pulsation are sensed in the vessel with spring 276, which is positioned to hold the pressure receiving means resiliently against increases in gas or liquid pressure in the vessel. A further step includes varying the volume in the vessel in relation to the sensed amplitude of the pulsating gas or liquid. This may be accomplished with any of the preferred structures described herein and illustrated in FIGS. 1–6. Smooth gas or liquid is then discharged from the vessel for transmission for end use applications.

While the invention has been described in conjunction with various embodiments, they are illustrative only. Accordingly, many alternatives, modifications and variations will be apparent to persons skilled in the art in light of the foregoing detailed description. The foregoing description is intended to embrace all such alternatives and variations falling within the spirit and broad scope of the appended claims.

I claim:

1. A gas or liquid pulsation dampening system comprising a spring pulsation dampening valve and a vessel for housing said valve and for containing a gas or liquid, said vessel having a pulsating gas or liquid inlet and a dampened gas or liquid outlet, and support means for holding said spring pulsation dampening valve in axial alignment with said dampened gas or liquid outlet, said spring pulsation dampening valve comprising first and second ends, a stationary outer sleeve, a gas or liquid flow restricting tube means positioned in the interior of said stationary sleeve for axial oscillation therein, said gas or liquid flow restricting tube means having a gas or liquid intake at the first end of said spring pulsation dampening valve and gas or liquid outlet at the second end of said spring pulsation dampening valve, and a spring operated pressure receiving means proximate to said gas or liquid intake for receiving and sensing gas or liquid pressure.

2. The gas or liquid pulsation dampening system of claim 1 wherein said spring operated pressure receiving means of said spring pulsation dampening valve is an extension of and integral with said gas or liquid flow restricting tube means, said pressure receiving means and gas or liquid flow restricting tube means moving axially and oscillating in said stationary tube in response to changes in gas or liquid pressure.

3. The gas or liquid pulsation dampening system of claim 2 wherein said pressure receiving means of said pulsation dampening valve is generally flared proximate to said gas or liquid intake at the first end of said spring pulsation dampening valve.

4. The gas or liquid pulsation dampening system of claim 3 wherein the spring of said spring operated pressure receiving means holds said pressure receiving means and said gas or liquid flow restricting tube means resiliently towards the gas or liquid intake at the first end of said pulsation dampening valve.

5. The gas or liquid pulsation dampening system of claim 2 wherein said spring pulsation dampening valve further comprises means for limiting axial movement of said gas or liquid flow restricting tube means and spring operated pressure receiving means in said stationary tube.

6. The gas or liquid pulsation dampening system of claim 5 wherein said means for limiting axial movement of said gas or liquid flow restricting tube means of said spring pulsation dampening valve comprises a retaining ring affixed to said stationary sleeve.

7. The gas or liquid pulsation dampening system of claim 2 wherein the spring pulsation dampening valve includes means for modulating gas or liquid flow positioned coaxially within the gas or liquid flow restricting tube means.

8. The gas or liquid pulsation dampening system of claim 7 wherein said means for modulating gas or liquid flow comprises a terminal end portion engaged with said stationary sleeve, a tapered body portion extending from said terminal end portion at least partially through said gas or liquid flow restricting tube means, the diameter of said tapered portion decreasing at increasing distances from the first end of said spring pulsation dampening valve, said tapered body portion providing said vessel with an enlarged volume as said gas or liquid flow restricting tube means retracts from said gas or liquid intake at the first end of said spring pulsation dampening valve in response to increased gas or liquid pressure.

9. The gas or liquid pulsation dampener of claim 8 wherein said tapered body includes conduit means for gas or liquid transmission through said body.

10. The gas or liquid pulsation dampening system of claim 1 wherein said support means comprises a back plate affixed to a wall of said vessel, said back plate having an opening aligned with said dampened gas or liquid outlet, said opening defined by a peripheral edge in said backplate, said stationary sleeve engaging with the peripheral edge of the opening in said backplate.

11. The gas or liquid pulsation dampening system of claim 10 wherein the spring of said spring operated pressure receiving means comprises a helical spring.

12. The gas or liquid pulsation dampening system of claim 11 wherein said helical spring is disposed in the interior of said stationary sleeve.

13. The gas or liquid pulsation dampening system of claim 11 wherein said helical type spring is positioned at the first end of said pulsation dampening valve adjacent to said pressure receiving means and the wall of said vessel at the second end of said pulsation dampening valve.

14. The gas or liquid pulsation dampening system of claim 1 wherein the spring of said spring loaded pressure receiving means is at least partially compressed in the absence of gas or liquid pulsations within said vessel.

15. The gas or liquid pulsation dampening system of claim 1 wherein said gas or liquid flow restricting tube means moves at least partially through said gas or liquid outlet at the second end of said spring pulsation dampening valve for discharging dampened gas or liquid in response to increases in gas or liquid pressure received by said pressure receiving means.

16. The gas or liquid pulsation dampening system of claim 1 wherein said stationary sleeve extends past said gas or liquid intake of the first end of said gas or liquid flow restricting tube means.

17. A gas or liquid pulsation dampening system comprising a spring pulsation dampening valve and a vessel for housing said valve and for containing a compressed gas or liquid, said vessel being subdivided into a plurality of interior chambers by at least one partition wall to provide at least one gas or liquid intake chamber with a pulsating gas or liquid inlet and at least one gas or liquid discharge chamber with a dampened gas or liquid outlet, said partition wall providing support means for holding said spring pulsation dampening valve in the gas or liquid intake chamber in axial alignment with said dampened gas or liquid outlet, said spring pulsation dampening valve comprising first and second ends, a stationary outer sleeve, a gas or liquid flow restricting tube means positioned in the interior of said stationary sleeve for axial movement therein, said gas or liquid flow restricting tube means having a gas or liquid intake adjacent to the first end of said spring pulsation dampening valve and gas or liquid outlet at the second end of said spring pulsation dampening valve, and a spring loaded pressure receiving means at said gas or liquid intake for receiving and sensing gas or liquid pressure.

18. The pulsation dampening system of claim 17 wherein said partition wall of said pulsation dampening valve comprises baffle means for acoustic dampening of sound vibrations within said vessel.

19. The gas or liquid pulsation dampening system of claim 18 wherein the spring pulsation dampening valve includes means for modulating gas or liquid flow positioned coaxially within the gas or liquid flow restricting tube means.

20. The gas or liquid pulsation dampening system of claim 19 wherein said means for modulating gas or liquid flow comprises a terminal end portion engaged with said stationary sleeve, a tapered body portion extending from said terminal end portion at least partially through said gas or liquid flow restricting tube means, the diameter of said tapered portion decreasing at increasing distances from the first end of said pulsation dampening valve, said tapered body portion providing said gas or liquid intake chamber with an enlarged volume as said gas or liquid flow restricting tube means retracts from said gas or liquid intake at the first end of said spring pulsation dampening valve in response to increased gas or liquid pressure.

21. The gas or liquid pulsation dampening system of claim 17 wherein said spring loaded pressure receiving means of said pulsation dampening valve is an extension of and integral with said gas or liquid flow restricting tube means, said pressure receiving means and gas or liquid flow restricting tube means moving axially and oscillating in said stationary tube in response to changes in gas or liquid pressure.

22. The gas or liquid pulsation dampening system of claim 21 wherein the gas or liquid flow restricting tube means of said spring pulsation dampening valve holds said spring loaded pressure receiving means resiliently towards the gas or liquid intake at the first end of said spring pulsation dampening valve.

23. The gas or liquid pulsation dampening system of claim 21 wherein said partition includes an orifice for receiving said gas or liquid flow restricting tube means of said spring pulsation dampening valve for discharging dampened gas or liquid into said gas or liquid discharge chamber in response to increases in gas or liquid pressure received by said spring loaded pressure receiving means.

24. A method of dampening pulsations in a gas or liquid at the intake or outlet of a compressor comprising the steps of:

(i) introducing a pulsating gas or liquid into a vessel;
(ii) sensing the amplitude of the gas or liquid pulsations with a spring pulsation dampener comprising a spring operated gas or liquid pulsation dampening valve mounted in said vessel, and
(iii) varying the volume of said vessel in relationship to the sensed amplitude of the gas or liquid pulsations by compressing and relaxing the spring of the spring operated gas or liquid pulsation dampening valve in response to the gas or liquid pulsations.

* * * * *